July 2, 1963 J. E. HILL ETAL 3,096,447

TRANSISTOR GATE BIASED BY SIGNAL BEING GATED

Filed March 21, 1961 3 Sheets-Sheet 1

INVENTOR.
JAMES E. HILL
DONALD B. LEVINSON
LANE L. WOLMAN
BY
ATTORNEY

TRANSISTOR GATE BIASED BY SIGNAL BEING GATED

Filed March 21, 1961 3 Sheets-Sheet 3

United States Patent Office 3,096,447

Patented July 2, 1963

3,096,447

TRANSISTOR GATE BIASED BY SIGNAL BEING GATED

James E. Hill, Sylmar, Donald B. Levinson, Beverly Hills, and Lane L. Wolman, North Hollywood, Calif., assignors to General Precision, Inc., a corporation of Delaware Filed Mar. 21, 1961, Ser. No. 97,285
5 Claims. (Cl. 307—88.5)

The present invention relates to an improved electronic switching system for routing between different origins and destinations a plurality of digital or analogue signals, and it relates more particularly to an improved transistorized electronic switching system of such a general type.

The electronic switching system of the present invention finds utility in data processing systems, for example, in routing signals between one or more computers and one or more magnetic drums, tapes, or other type of file systems. For that reason, the electronic switching system of the invention will be described in such an environment. It will become evident, however, as the present description proceeds, that the electronic switching system of the invention will find general utility wherever it is desired to route electrical signals on a large scale between different points.

The electronic switching system to be described is generally similar to an electro-mechanical relay system in its operation. Electro-mechanical relays have previously been used in the more complex signal routing systems, and the electronic switching system of the present invention is intended to replace such relays in such routing systems. Prior attempts to effectuate such a replacement by the use of electronic tube switching systems have proven to be impractical in the larger and more complex routing systems.

It is usual in the more complex data processing systems that the various units comprising the system be housed in different consoles. It is also usual to provide a duplexer console to handle the routing of signals between the different consoles of the prior art system. The consoles are intercoupled by transmission lines.

However, in the prior art system referred to in the preceding paragraph, there is the normal requirement that the receiving ends of the transmission lines be terminated at the different consoles. This requirement necessitates extraneous and relatively complex circuitry in the duplexer console of the prior art systems.

An important object of the present invention is to provide an improved electronic switching system which is capable of replacing the prior art duplexer consoles and which obviates any need to terminate the transmission lines except at their ultimate destination.

A more general object of the invention is to provide an improved electronic switching system which is capable of routing digital or analogue signals on a large scale basis and between any desired number of origins and destinations.

Another object of the invention is to provide such an improved electronic switching system which is relatively simple in its individual switch construction and which requires a relatively small amount of control power.

A feature of the invention is the provision of an electronic switching system which does not require a separate direct current power supply, but which is capable of operation solely by the switching signal and the translated signal power.

The features of the invention which are believed to be new are set forth in the claims. The invention itself, however, may best be understood by reference to the following description when taken in conjunction with the accompanying drawings in which:

Figure 4:
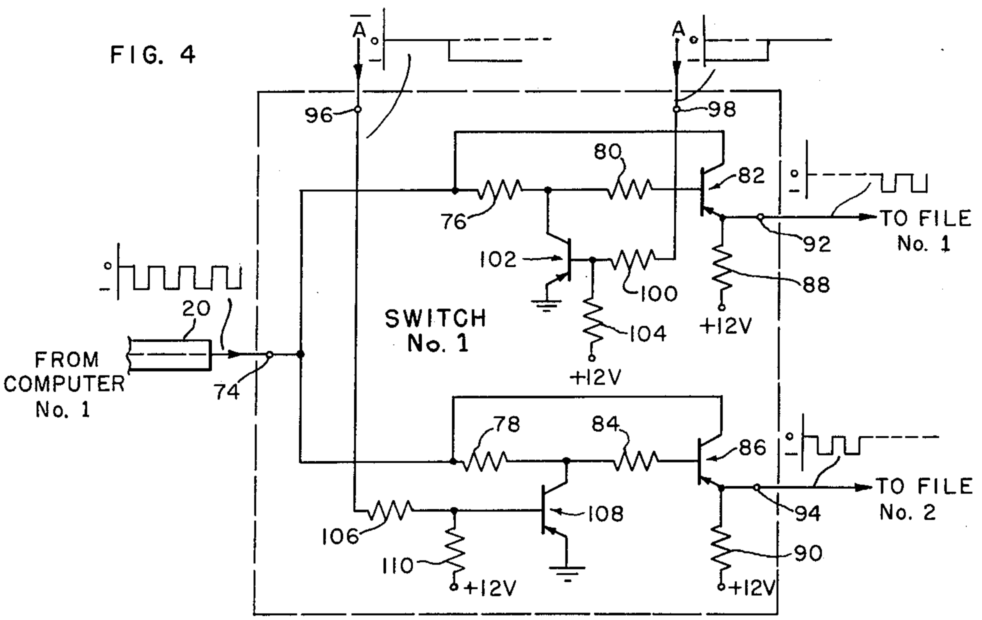
Figure 5:
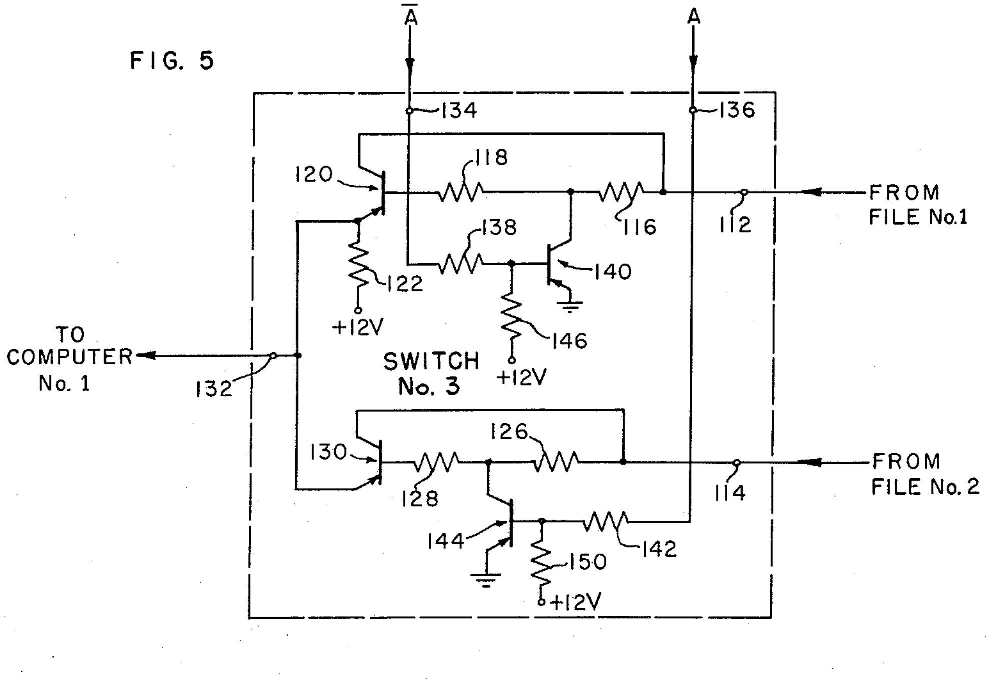

FIGURE 4 is a circuit diagram of electronic switching circuitry constructed in accordance with the one embodiment of the invention and by which a single input from a particular source may be selectively routed to a first and second destination; and FIGURE 5 is a circuit diagram of electronic switching circuitry constructed in accordance with another embodiment of the invention and by which a pair of inputs from different sources may be selectively introduced to a single destination.

Figure 1:
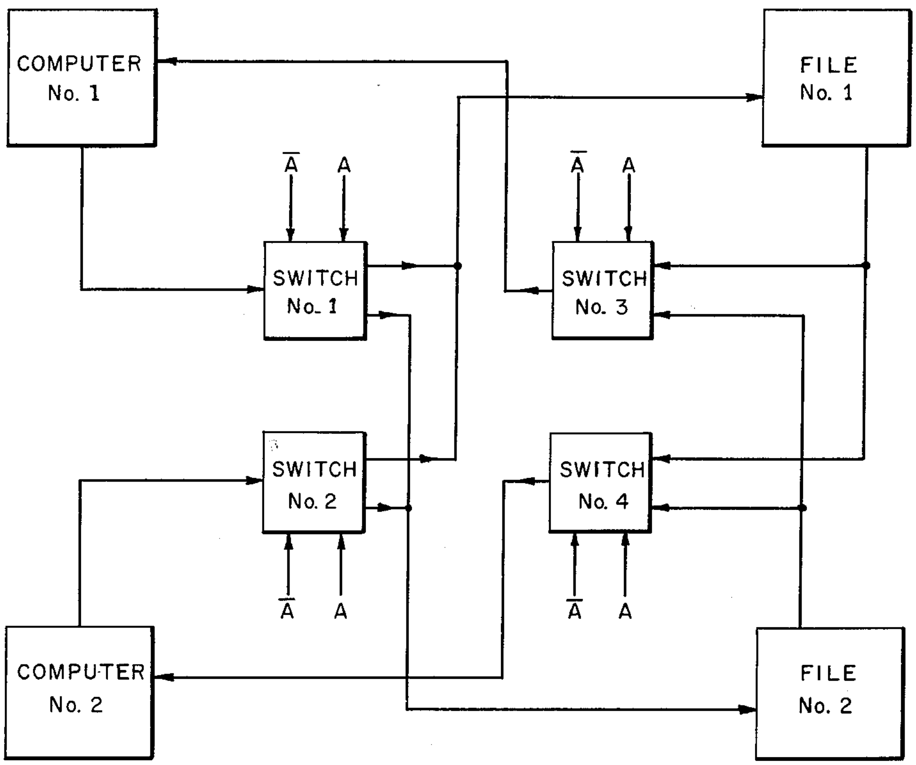
FIGURE 1 is a block diagram of a typical switching system which may incorporate electronic switching circuitry constructed in accordance with the concepts of the invention.

The block diagram of FIGURE 1 includes a first computer and a second computer. These computers, for example, may be of any known type of electronic digital or analog computer, or, data processors, so long as the input levels are adapted to provide the proper direct current reference. The computers of FIGURE 1 are designated respectively "Computer No. 1" and "Computer No. 2." The system of FIGURE 1 also includes a pair of filing systems, designated respectively as "File No. 1" and "File No. 2" These filing systems may be constructed in accordance with any known techniques, and they may take the form, for example, of magnetic memory drum systems, magnetic tape systems, or the like.

The switching system of FIGURE 1 is effective to selectively introduce signals from the Computer No. 1 to the File No. 1 or File No. 2; to selectively introduce signals from Computer No. 2 to File No. 1 or File No. 2; to selectively introduce signals from the File No. 1 or File No. 2 to the Computer No. 1; and to selectively introduce signals from the File No. 1 or File No. 2 to the Computer No. 2.

The particular switching system of FIGURE 1 is represented by a group of four blocks which are designated Switch No. 1, Switch No. 2, Switch No. 3 and Switch No. 4. It will become evident as the description proceeds that the switching system of the invention is not limited to any particular number of computers or filing systems, or other origins and destinations; and that it can be used in conjunction with any number of computers and any number of filing systems to controllably route signals between the computers and the different filing systems.

The Switch No. 1 has an input terminal which receives signals from the Computer No. 1, and it has a pair of output terminals which selectively introduce signals to the File No. 1 and to the File No. 2. The Switch No. 1 is under the control of a pair of signals designated A and $\bar{A}$.

Likewise, the Switch No. 2 has an input terminal which receives signals from the Computer No. 2 and it has a pair of output terminals respectively coupled to the File No. 1 and to the File No. 2. The File No. 2 is illustrated as also being under the control of the signals A and $\bar{A}$.

The Switch No. 3 in the system of FIGURE 1 receives signals from the File No. 1 and from the File No. 2, and the output terminal of the Switch No. 3 is coupled to the Computer No. 1. The Switch No. 3, for example, is also under the control of the signals A and $\bar{A}$.

The Switch No. 4 in the system of FIGURE 1 has a pair of input terminals which receive signals from the File No. 1 and from the File No. 2. The Switch No. 4 has a common output terminal which is coupled to the Computer No. 2. As illustrated in FIGURE 1, the Switch No. 4 is also under the control of the control signals A and $\overline{A}$.

Figure 2:
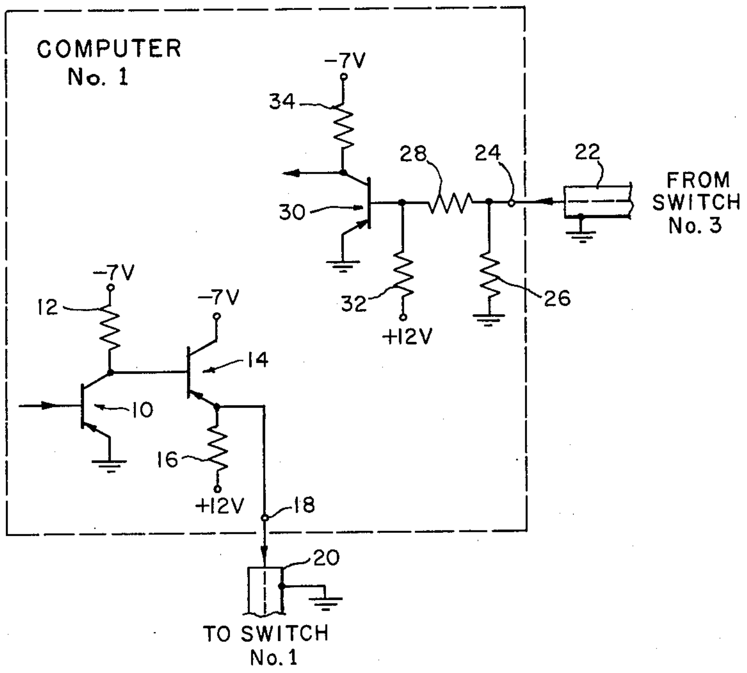
FIGURE 2 is a fragmentary circuit diagram showing typical input and output circuits for a computer for coupling the computer to the electronic switching system of the invention.

The fragmentary circuit diagram of FIGURE 2 represents appropriate input and output circuitry for the Computer No. 1. It will be understood that similar circuitry may be incorporated into the Computer No. 2.

Output signals from the Computer No. 1 are introduced to the base of a transistor 10. This transistor may be a PNP transistor, and it may be of the type presently designated 2N393. The emitter of the transistor 10 is grounded, and the collector is connected to a resistor 12 and to the base of a transistor 14. The resistor 12 may have a resistance of 680 ohms, for example, and it is connected to the negative terminal of a 7 volt direct voltage source.

The transistor 14 may also be of the PNP type, and it may be of the type designated 2N599. The collector of the transistor 14 is connected to the negative terminal of a 7 volt direct voltage source, and the emitter is connected to a resistor 16. The resistor 16 may, for example, have a resistance of 1 kilo ohm, and it is connected to the positive terminal of a 12 volt direct voltage source.

The emitter of the transistor 14 is also connected to an output terminal 18. This output terminal is connected to the switch number 1 of FIGURE 1 by way of a coaxial line 20. This coaxial line may, for example, have a maximum length of the order of 50 feet.

The Computer No. 1 may receive input signals from the Switch No. 3 of FIGURE 1 over a coaxial line 22. This coaxial line is connected to an input terminal 24 which, in turn, is connected to the junction of a resistor 26 and a resistor 28. The resistor 26 is grounded, and it may have a resistance, for example, of 75 ohms. The resistor 28 may have a resistance, for example, of 1.5 kilo ohms, and it is connected to the base of a transistor 30.

The base of the transistor 30 is also connected to a resistor 32. The resistor 32 may have a resistance of 30 kilo ohms, and it is connected to the positive terminal of the 12 volt direct voltage source.

The transistor 30 may be of the PNP type, and it may be of the type presently designated 2N393. The emitter of the transistor 30 is grounded, and the collector is connected to a resistor 34. The resistor 34 may have a resistance of 680 ohms, for example, and it is connected to the negative terminal of the 7 volt direct voltage source. The collector of the transistor 30 also introduces signals to the Computer No. 1.

Figure 3:
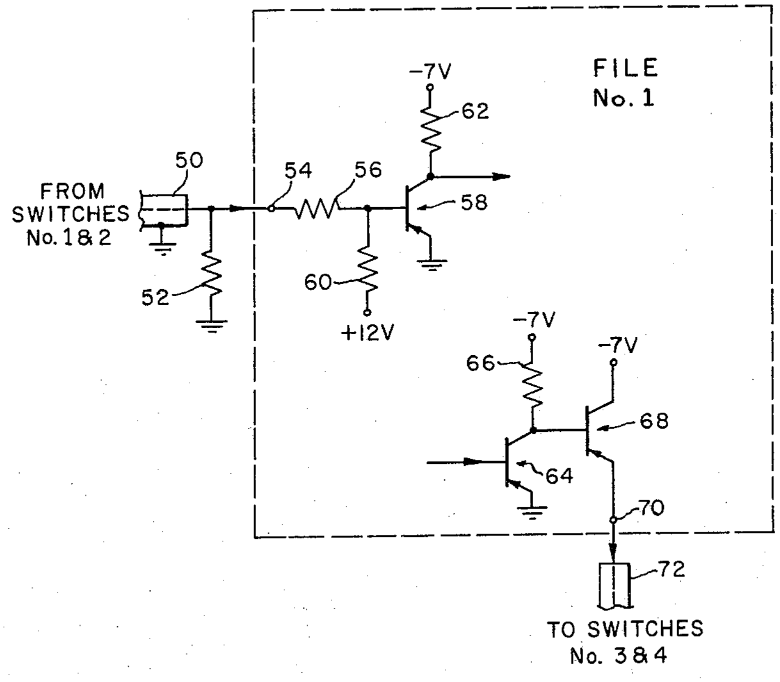
FIGURE 3 is a fragmentary circuit diagram showing typical input and output circuits for coupling a file system to the electronic switching network of the invention.

The input and output circuitry of the File No. 1 is shown in fragmentary form in FIGURE 3. It will be understood that the File No. 2 may incorporate the same circuitry. The File No. 1 receives signals from the Switch No. 1 and from Switch No. 2 over a coaxial line 50. This coaxial line, for example, may have a maximum length of 450 feet. The coaxial line is connected to a grounded resistor 52, and it is also connected to an input terminal 54 of the File No. 1.

The input terminal 54 is connected to a resistor 56 which, in turn, is connected to the base of a PNP transistor 58 and to a resistor 60. The resistor 60 is connected to the positive terminal of a 12 volt direct voltage source. The resistor 56 may have a resistance of 2.2 kilo ohms, for example, and the resistor 60 may have a resistance of 62 kilo ohms. The transistor 58 may be of the type designated 2N393.

The emitter of the transistor 58 is grounded, and the collector of the transistor is connected to a resistor 62. The resistor 62 may have a resistance, for example, of 680 ohms, and it is connected to the negative terminal of a 7 volt direct voltage source. The collector of the transistor 58 also introduces signals into the File No. 1 through usual known circuitry.

The output signals from the File No. 1 are applied to the base of a transistor 64. This transistor is a PNP type, and it may be of the type presently designated 2N393. The emitter of the transistor 64 is grounded, and the collector is connected to a resistor 66. The resistor 66 may have a resistance of 680 ohms, and it is connected to the negative terminal of the 7 volt direct voltage source. The collector of the transistor 64 is also connected to the base of a transistor 66. The latter transistor also may be o fthe PNP type, and it may be of the type designated 2N599. The collector of the transistor 68 is connected to the negative terminal of the 7 volt direct voltage source, and the emitter of the transistor is connected to an output terminal 70. The output terminal 70 is connected through a coaxial line 72 to the Switch No. 3 and to Switch No. 4 of FIGURE 1. This coaxial line may have a maximum length of the order of 350 feet.

The Switch No. 1 of FIGURE 1 may incorporate the circuitry shown in FIGURE 4, in accordance with the concepts of the invention. It is to be understood that the Switch No. 2 of FIGURE 1 may be connected in the same manner. The coaxial line 20 from the Computer No. 1 of FIGURE 1 is connected to an input terminal 74 of the Switch No. 1 in FIGURE 4. The terminal 74 is connected to a resistor 76 and to a resistor 78. The resistors 76 and 78 each may have a resistance, for example, of 300 ohms. The resistor 76 is connected through a resistor 80 to the base of a transistor 82. The resistor 78 is connected through a resistor 84 to the base of a transistor 86. The resistors 80 and 84 each may have a resistance of 100 ohms. The transistors 82 and 86 are PNP transistors, and they may be of the type presently designated 2N599.

The collector of the transistor 82 is connected back to the input terminal 74, as is the collector of the transistor 86. The emitter of the transistor 82 is connected to a resistor 88, and the emitter of the transistor 86 is connected to a resistor 90. The resistors 88 and 90 may each have a resistance of 2 kilo ohms, and both are connected to the positive terminal of a 12 volt direct voltage source. The voltage from this source is used to discharge any capacitance charges in the associated circuitry. The connection to this source is not essential in the operation of the switching circuit, especially in conjunction with signal waveforms other than rectangular.

The emitter of the transistor 82 is connected to an output terminal 92 which is connected to the File No. 1 of FIGURE 1. The emitter of the transistor 86 is connected to an output terminal 94 which is connected to the File No. 2 of FIGURE 1.

The control signal A is applied to an input terminal 98 and the control signal $\overline{A}$ is applied to an input terminal 96. The terminal 96 is connected to a resistor 100, and the resistor 100 is connected to the base of a transistor 102 and to a resistor 104. The resistor 104 is connected to the positive terminal of the 12 volt direct voltage source. The resistor 100 may have a resistance, for example, of 1 kilo ohm, and the resistor 104 may have a resistance of 51 kilo ohms. The transistor 102 is a PNP transistor, and it may be of the type designated 2N711. The emitter of the transistor 102 is grounded, and the collector is connected to the junction of the resistors 76 and 80.

The input terminal 96 is connected through a resistor 106 to the base of a transistor 108. The base of the transistor 108 is also connected through a resistor 110 to the positive terminal of the 12 volt direct voltage source. The resistor 106 may have a resistance of 1 kilo ohm, and the resistor 110 may have a resistance of 51 kilo ohms. The transistor 108 is a PNP transistor, and it may be of the type designated 2N711. The emitter of the transistor 108 is grounded, and the collector is connected to the junction of the resistors 78 and 84.

The Switch No. 3 of FIGURE 1 may incorporate the circuitry shown in FIGURE 5, and the Switch No. 4 may incorporate similar circuitry. The Switch No. 3 has a first input terminal 112 which receives signals from the File No. 1, and it includes a second input terminal 114 which receives signals from the File No. 2.

The input terminal 112 is connected through a resistor 116 and a resistor 118 to the base of a PNP transistor 120. The resistor 116 may have a resistance of 300 ohms, and the resistor 118 may have a resistance of 100 ohms. The transistor 120 may be of the type designated 2N599. The collector of the transistor 120 is connected back to the input terminal 112, and the emitter of the transistor is connected through a resistor 122 to the positive terminal of the 12 volt direct voltage source. This latter resistor may have a resistance, for example, of one kilo ohm.

The input terminal 114 is connected through a pair of resistors 126 and 128 to the base of a PNP transistor 130. The resistor 126 may, for example, have a resistance of 300 ohms, and the resistor 128 may have a resistance of 100 ohms. The transistor 130 may be of the type designated 2N599. The emitters of the transistors 120 and 130 are connected together, and they are connected by a common line to an output terminal 132. The output terminal 132 supplies signals to the Computer No. 1 of FIGURE 1.

The control signal $\overline{A}$ is applied to an input terminal 134 of the switch number 3, and a control signal A is applied to an input terminal 136. The input terminal 134 is connected through a resistor 138 to the base of a transistor 140, and the input terminal 136 is connected through a resistor 142 to the base of a transistor 144. The resistors 138 and 142 may each have a resistance, for example, of one kilo ohm. Both the transistors 140 and 144 may be of the PNP type, and they may be of the type designated 2N711.

The emitter of the transistor 140 is grounded, and its collector is connected to the junction of the resistors 116 and 118. The base of the transistor 140 is connected through a resistor 146 to the positive terminal of the 12 volt direct voltage source. The resistor 146 may have a resistance of 57 kilo ohms.

The emitter of the transistor 144 is grounded, and the collector of the transistor is connected to the junction of the pair of resistors 126 and 128. The base of the transistor 144 is connected to a resistor 150. The resistor 150 may have a resistance, for example, of 51 kilo ohms, and it is connected to the positive terminal of the 12 volt direct voltage source.

As described above, the system illustrated in FIGURE 1 is under the control of a control signal A and its complement $\overline{A}$. When the control signal $\overline{A}$ is true, output signals from the Computer No. 1 are fed through the Switch No. 1 to the File No. 2; output signals from the File No. 1 are fed through the Switch No. 3 to Computer No. 1; output signals from the Computer No. 2 are fed through the Switch No. 2 to the File No. 1; and output signals from the File No. 2 are fed through the Switch No. 4 to the Computer No. 2.

On the other hand, when the control signal A is true, output signals from the Computer No. 1 are fed through the Switch No. 1 to the File No. 1; output signals from the File No. 1 are fed through the Switch No. 4 to the Computer No. 2; output signals from the Computer No. 2 are fed through the Switch No. 2 to the File No. 2; and output signals from the File No. 2 are fed through the Switch No. 3 to the Computer No. 1.

As shown in more detail in FIGURE 2, the output circuit of the Computer No. 1 includes the circuitry of the transistor 10 which is connected as a grounded emitter amplifier, and the circuitry of the transistor 14 which is connected as an emitter follower. The signals from the emitter follower transistor 14 are transmitted through the co-axial line 20 to the Switch No. 1 of FIGURE 4. These signals are directly introduced to the circuitry of FIGURE 4; in which they are applied to the collectors of the transistors 82 and 86.

When the signal A is true, it has a zero value and the transistor 102 is cut off. This is because the resulting positive voltage appearing at the junction of the resistors 100 and 104 biases the base of the transistor 102 to a positive value, so that the transistor is rendered nonconductive. This permits the signals appearing across the resistor 16 in FIGURE 2, and introduced to the collector of the transistor 82, to appear across the resistor 88. The signals appearing across the resistor 88 are applied by way of the output terminal 92 to the File No. 1 of FIGURES 1 and 3.

When the control signal A is false, however, it has a negative value and the transistor 102 becomes conductive. This establishes the junction of the resistors 76 and 80 at substantially zero or ground potential which, in turn, causes the transistor 82 to become nonconductive to the signals from the Computer No. 1. The conductivity of the transistor 102 also establishes a low impedance path to ground for the signals from the Computer No. 1 through the resistor 76. These signals are attenuated, therefore, and any possibility of their reaching the output terminal 92 is prevented.

In the same manner, when the control signal $\overline{A}$ is true, the circuitry of the transistors 86 and 108 permits the signals from the Computer No. 1 to reach the output terminal 94 for application to the File No. 2. In the same manner, when the signal $\overline{A}$ is false, the resulting conductivity of the transistor 108 prevents these signals from reaching the output terminal 94. It follows, therefore, that under the control of the control signal A, the signals from the Computer No. 1 may be selectively switched to the output terminal 92 or 94.

The improved and unique circuitry of the switch shown in FIGURE 4 permits a relatively low power control signal quickly and completely to control the switching of analogue or digital signals from the Computer No. 1 to the File No. 1 or File No. 2. As mentioned previously, the Switch No. 2 may have similar circuitry, and it also may be under the control of the same control signal A. Of course, different control signals may be used to control the switches of FIGURE 1.

The signals from the output terminal 92 of the circuitry of FIGURE 4 appear across the resistor 52 of FIGURE 3. These signals are then introduced to the circuitry of the transistor 58. The transistor 58 is connected as a grounded emitter amplifier and the amplified signals appear at its collector for introduction to the storage components of the File No. 1. The grounded emitter amplifier of the transistor 58 may represent one of a plurality of input gates for the File No. 1, and these gates may be under the control of appropriate gating signals to selectively introduce signals from the Switch No. 1 to the different storage components of the File No. 1. As mentioned previously, the Switch No. 2 of FIGURE 1 is also connected through the co-axial line 50 to the File No. 1. The File No. 2, as mentioned above, may include similar circuitry.

As shown in FIGURE 3, the output circuitry of the File No. 1 includes a ground emitter circuit of the transistor 64, this circuit being connected to the circuitry of the transistor 68. The transistor 68 is connected as an emitter follower, and its output signal is applied by way of the output terminal 70 and through the co-axial line 72 to the Switches No. 3 and No. 4.

The circuitry of the Switch No. 3 is shown in FIGURE 5, and the signals from the File No. 1 are introduced through the input terminal 112 to the circuitry of the transistors 120 and 140. In like manner, the signals from the File No. 2 are introduced through the input terminal 114 to the circuitry of the transistors 130 and 144.

The above mentioned circuitry in the Switch No. 3 of FIGURE 5 is similar to that described above in conjunction with FIGURE 4. Likewise, the Switch No. 3 may be under the control of the control signals A, $\overline{A}$ or it may be under the control of independent control signals. The illustrated control signals A, $\overline{A}$ cause the signals from the File No. 1 or from the File No. 2 selectively to be switched to the output terminal 132 for application to the Computer No. 1.

As shown in FIGURE 2, the incoming signals from the Switch No. 3 are applied by way of the input terminal 24 to the circuitry of the transistor 30. The transistor 30 is connected as a grounded emitter amplifier, and the amplified signals appear at its collector for introduction to the computer.

The invention provides, therefore, an improved switching system which may be conveniently controlled by relatively low power control signals to route a plurality of analogue or digital signals between a plurality of sources and destinations.

The improved switching system of the invention utilizes relatively simple circuitry, and functions in an improved and superior manner to achieve its desired signal routing purpose.

We claim:

1. In a switching system which includes: a first component having an output circuit and at least one further component having an input circuit, said output circuit including an impedance element connected to a source of direct current exciting potential and across which output signals appear, said input circuit including an impedance element connected to a point of reference potential, a switching component for selectively introducing said output signals from said output circuit of said first component to said impedance element in said input circuit of said further component including in combination: an electronic discharge device having a first electrode, a second electrode and a third electrode; input terminal means for receiving said output signals from said first component; a direct current circuit connection from said input terminal means to said first electrode of said electronic discharge device to supply exciting power to said first electrode from said output signals; second circuit means including first and second series-connected resistance means connected to said input terminal means and to said second electrode of said electronic discharge device; output terminal means connected to said third electrode of said electronic discharge device for receiving said signals for application to said impedance element in said input circuit of said further component; and means for selectively establishing the common junction of said first and second resistance means at different potential levels to control the passage of said signals through said electronic discharge device.

2. In a switching system which includes: a first component having an output circuit and at least one further component having an input circuit, said output circuit including an impedance element connected to a source of direct current exciting potential and across which output signals appear, said input circuit including an impedance element connected to a point of reference potential, a switching component for selectively introducing said output signals from said output circuit of said first component to said impedance element in said input circuit of said further component including in combination: a transistor having an emitter electrode, a collector electrode and a base electrode; input terminal means for receiving said output signals from said first component; a direct current circuit connection from said input terminal means to said collector electrode of said transistor to supply exciting power to said collector electrode from said output signals; second circuit means including first and second series-connected resistance means connected to said input terminal means and to said base electrode of said transistor, output terminal means connected to said emitter electrode of said transistor for receiving said signals for application to said impedance element in said input circuit of said further component, and means responsive to an applied control signal for selectively establishing the common junction of said first and second resistance means at different potential levels to control the passage of said signals through said transistor.

3. In a switching system which includes: a first component having an output circuit and at least one further component having an input circuit, said output circuit including an impedance element connected to a source of direct current exciting potential across which output signals appear, said input circuit including an impedance element connected to a point of reference potential, a switching component for selectively introducing said output signals from said output circuit of said first component to said impedance element in said input circuit of said further component including in combination: a first transistor having an emitter electrode, a collector electrode and a base electrode; input terminal means for receiving said output signals from said first component; a direct current circuit connection from connecting said input terminal means to said collector electrode of said first transistor to supply exciting power to said collector electrode from said output signals; second circuit means including first and second series-connected resistance means connected to said input terminal means and to said base electrode of said first transistor; output terminal means connected to said emitter electrode of said first transistor for receiving said signals for application to said impedance element in said input circuit of said further component, a second transistor having a first electrode connected to the common junction of said first and second resistance means and having a second electrode connected to a point of reference potential; and further circuit means for introducing a control signal to said second transistor selectively to render said second transistor conductive and nonconductive.

4. In a switching system which includes: a first component having an output circuit and at least one further component having an input circuit, said output circuit including an impedance element connected to a source of direct current exciting potential and across which output signals appear, said input circuit including an impedance output connected to a point of reference potential, a switching component for selectively introducing said output signals from said output circuit of said first component to said impedance element in said input circuit of said further component including in combination: a first transistor having a base electrode, an emitter electrode and a collector electrode; input terminal means for receiving said output signals from the output circuit of said first component; first circuit means directly connecting said input terminal means to said collector electrode of said first transistor to supply exciting power to said collector electrode from said output signals; second circuit means including first and second series-connected resistors connected to said input terminal means and to said base electrode of said first transistor; output impedance means connected to said emitter electrode of said first transistor and to a terminal of a direct current exciting potential source; output terminal means connected to said emitter electrode of said first transistor for receiving said signals for application to said impedance element in said input circuit of said further component; a second transistor having an emitter electrode connected to said point of reference potential, having a collector electrode connected to the common junction of said first and second resistors, and having a base electrode; and circuit means for introducing a control signal to said base electrode of said second transistor selectively to render said second transistor conductive and nonconductive.

5. In a switching system which includes: a first component having an output circuit and at least one further component having an input circuit, said output circuit including an impedance element connected to a source of direct current exciting potential across which output signals appear varying between a zero potential level and a negative potential level, said input circuit including an impedance element connected to a point of reference potential, a switching component for selectively introducing said output signals from said output circuit of said first component to said impedance element in said input circuit of said further component including in combination: a first PNP transistor having a base electrode, an emitter electrode and a collector electrode; input terminal means for receiving said output signals from said output circuit of said first component, first circuit means directly connecting said input terminal means to said collector electrode of said first transistor to supply exciting power to said collector electrode from said output signals; second circuit means including first and second series-connected resistors connected to said input terminal means and to said base electrode of said first transistor; output impedance means connected to said emitter electrode of said first transistor and to the positive terminal of a direct current exciting potential source; output terminal means connected to said emitter electrode of said first transistor for receiving said signals for application to said impedance element in said input circuit of said further component; a second PNP transistor having an emitter electrode connected to said point of reference potential, having a collector electrode connected to the common junction of said first and second resistors, and having a base electrode; and circuit means including a first resistor connected to the positive terminal of a direct current exciting potential source, and further including a series resistor connected to the base electrode of the second transistor for introducing a control signal to said base electrode of said second transistor selectively to render said second transistor conductive and non-conductive.

References Cited in the file of this patent

UNITED STATES PATENTS

| | | |
|---|---|---|
| 2,982,868 | Emile | May 2, 1961 |